US012663076B2

(12) United States Patent
Lepa et al.

(10) Patent No.: US 12,663,076 B2
(45) Date of Patent: Jun. 23, 2026

(54) GEAR SHIFTING DEVICE, A TRANSMISSION AND A METHOD FOR ASSEMBLING A TRANSMISSION

(71) Applicant: VOLVO TRUCK CORPORATION, Gothenburg (SE)

(72) Inventors: Jenny Lepa, Lindome (SE); Klas Bergström, Västra Frölunda (SE); Eduardo Erbesdobler, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/869,114

(22) PCT Filed: Jun. 2, 2022

(86) PCT No.: PCT/EP2022/065113
§ 371 (c)(1),
(2) Date: Nov. 25, 2024

(87) PCT Pub. No.: WO2023/232259
PCT Pub. Date: Dec. 7, 2023

(65) Prior Publication Data
US 2026/0002587 A1      Jan. 1, 2026

(51) Int. Cl.
*F16H 63/08* (2006.01)
*F16H 57/02* (2012.01)
(Continued)

(52) U.S. Cl.
CPC ............. *F16H 63/08* (2013.01); *F16H 63/32* (2013.01); *F16H 2057/02043* (2013.01);
(Continued)

(58) Field of Classification Search
CPC .... F16H 63/08; F16H 63/32; F16H 2063/321; F16H 2063/3073; F16H 2063/3076; F16H 2063/3079; F16H 57/023
See application file for complete search history.

(56) References Cited

U.S. PATENT DOCUMENTS 8,413,537 B2 * 4/2013 Garabello ............... F16H 63/30
74/473.36
9,976,650 B1 * 5/2018 Singh ...................... F16H 59/70
(Continued)

FOREIGN PATENT DOCUMENTS

CN         107191590 A  *  9/2017  ............. F16H 63/32
DE    202015104756 U1  *  12/2016  ......... F16H 63/3023
(Continued)

OTHER PUBLICATIONS

International Search Report and Written Opinion of the International Searching Authority in corresponding International Application No. PCT/EP2022/065113 mailed Jan. 4, 2023 (12 pages).
(Continued)

*Primary Examiner* — Bobby Rushing, Jr.
(74) *Attorney, Agent, or Firm* — Jeffri A. Kaminski; Venable LLP

(57)                ABSTRACT

A gear shifting device for a transmission of a vehicle has a rod configured to be connected to an actuator for moving the rod along a longitudinal axis of the rod, and a set of shift forks comprising a first shift fork and a second shift fork, the first and second shift forks being fixed to the rod so as to be actuated in unison. The rod has a first part and a second part configured to be mechanically connected to each other via at least one connection interface, wherein the first shift fork is fixed to the first part of the rod and the second shift fork is fixed to the second part of the rod.

13 Claims, 5 Drawing Sheets

(51) Int. Cl.
    *F16H 63/32*         (2006.01)
    *F16H 63/30*         (2006.01)

(52) U.S. Cl.
    CPC .. *F16H 63/3069* (2013.01); *F16H 2063/3073* (2013.01); *F16H 2063/3079* (2013.01)

(56)           References Cited

U.S. PATENT DOCUMENTS

| | | | | |
|---|---|---|---|---|
| 10,900,564 B2 * | 1/2021 | Sinka | ..................... | F16H 63/30 |
| 11,701,960 B2 * | 7/2023 | Gassmann | ............. | B60K 6/547 |
| | | | | 475/5 |
| 2003/0136214 A1 | 7/2003 | Dinger et al. | | |

FOREIGN PATENT DOCUMENTS

| | | | | |
|---|---|---|---|---|
| DE | 102019005647 A1 * | 7/2020 | ............. | F16H 63/20 |
| EP | 3530994 A1 | 8/2019 | | |
| EP | 3559516 A1 | 10/2019 | | |
| EP | 3862597 A1 * | 8/2021 | ............ | F16H 63/30 |
| WO | 2005088172 A1 | 9/2005 | | |
| WO | 2018114002 A1 | 6/2018 | | |

OTHER PUBLICATIONS

Written Opinion of the International Preliminary Examining Authority in corresponding International Application No. PCT/EP2022/065113 mailed Jun. 20, 2024 (6 pages).
International Preliminary Report on Patentability in corresponding International Application No. PCT/EP2022/065113 mailed Sep. 12, 2024 (7 pages).
European Communication under Rule 71(3) EPC dated Mar. 4, 2026 in corresponding European Patent Application No. 22731646.0, 8 pages.

* cited by examiner

GEAR SHIFTING DEVICE, A TRANSMISSION AND A METHOD FOR ASSEMBLING A TRANSMISSION

CROSS-REFERENCE TO RELATED APPLICATIONS

This application is a U.S. National Stage application of PCT/EP2022/065113, filed Jun. 2, 2022 and published on Dec. 7, 2023, as WO 2023/232259, all of which is hereby incorporated by reference in its entirety.

TECHNICAL FIELD

The invention relates to a gear shifting device for a transmission of a vehicle, a transmission, a method for assembling a transmission, and a vehicle.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

Conventional automated or semi-automated transmissions for motor vehicles are typically provided with a plurality of actuators for shifting gears, wherein each actuator is configured to act on a rod carrying a shift fork. The shift fork is connected to a gear engaging sleeve, which depending on its axial position engages or disengages a gearwheel. To shift gears, one or more actuators are activated to act on the rod(s), thereby moving the shift fork and the sleeve in an axial direction to select a desired gear ratio for torque transfer, or a neutral gear.

There are also transmissions in which several shift forks are mounted on the same rod, wherein the shift forks may, e.g., be slidably mounted on the rod and selectively fixable to the rod in dependence on gear selection. In this way, a single rod may be used to move several shift forks. An example of such a transmission is disclosed in WO2005/088172.

It may however be advantageous in some cases to use a single rod to actuate two shift forks in unison to act on two different gear engaging sleeves. The two sleeves may, for example, be provided on opposite sides of the same gearwheel, and used to drivingly connect the gearwheel to either a first component or a second component, depending on the desired gear ratio. For a lightweight, compact, and yet strong transmission design, it is generally desirable to provide the sleeves movable into annular pockets of the gearwheel, provided under, i.e., radially inside of, the gearwheel's gear teeth. In this way, a gear tooth face width of the gearwheel may be made relatively large without adding too much weight to the gearwheel.

However, assembly of such a compact transmission comprising two shift forks fixedly mounted to a single rod and configured to move in unison is problematic when the shift forks need to be able to move in and out of opposite annular pockets of the gearwheel. Assembly of a transmission is usually carried out using pre-assembled parts, such as a pre-assembled set of a rod and a shift fork, wherein the rod is connected to an actuator, such as a pneumatic or electric actuator. The rod, shift fork and actuator may be assembled with a transmission control unit and mounted onto an opening of a transmission housing, in which the other components of the transmission are provided. The mounting is carried out such that the shift forks engage with their corresponding sleeves as the transmission control unit is lowered onto the transmission housing.

When two shift forks that need to be able to reach into annular pockets on opposite sides of a gearwheel are fixed on the same rod, it becomes difficult to engage the shift forks with their respective sleeves in a mounting process such as described above, since the sleeves will be at least partially hidden in the annular pockets.

SUMMARY

An object of the invention is to provide a gear engaging device that in at least some aspect facilitates assembly of transmissions having more than one shift forks that are to be actuated in unison using a single actuator. Another object is to provide such a transmission which is in at least some aspect easier to assemble than known such transmissions. Yet another object is to provide a method for assembling such a transmission, which method is in at least some aspect facilitated with respect to known methods of assembly. In particular, it is an object to facilitate mounting of transmissions in which two shift forks actuated in unison need to access oppositely located annular pockets of one or more gearwheels.

According to a first aspect of the invention, at least one of the objects is achieved by a gear shifting device according to claim 1.

Thus, a gear shifting device for a transmission of a vehicle is provided. The gear shifting device comprises:
   a rod configured to be connected to an actuator for moving the rod along a longitudinal axis of the rod, and
   a set of shift forks comprising a first shift fork and a second shift fork, the first and second shift forks being fixed to the rod so as to be actuated in unison.
The rod comprises a first part and a second part configured to be mechanically connected to each other via at least one connection interface, wherein the first shift fork is fixed to the first part of the rod and the second shift fork is fixed to the second part of the rod.

By the provision of a rod comprising at least two mechanically connectable parts, the shift forks being provided on the different parts, assembly of a transmission having two shift forks actuated in unison may be significantly facilitated. When in use in the transmission, the first and second parts of the rod are mechanically connected via the connection interface. The respective parts may be preassembled with their respective shift forks and connected as the transmission is assembled. This particularly facilitates assembly in transmissions in which two shift forks need to alternatingly be able to reach in under one or more gear tooth portions, such as the same gear tooth portion, from different directions to provide different gear ratios. In this case, the proposed configuration of the gear shifting device allows a first engagement of one of the shift forks and an associated exposed gear engaging sleeve, and a subsequent axial shift of the part of the rod carrying the engaged shift fork so that the gear engaging sleeves moves into a hidden position under the gear tooth portion. Thereafter, the other shift fork can be engaged with the other gear engaging sleeve, being in an exposed position, at the same time as the first and second parts of the rod are connected.

The gear shifting device is usable with pneumatic or electro-pneumatic actuators as well as with electric actuators.

Optionally, the first part of the rod comprises a first interlocking member and the second part of the rod comprises a second interlocking member, wherein the first and second interlocking members are configured to, when interlocked, prevent relative movement of the first and second parts along the longitudinal axis. The interlocking members herein constitute the connection interface. The first and second interlocking members may preferably be a male and a female interlocking member, respectively. The first and second parts of the rod may hereby be moved in unison along the longitudinal direction.

Optionally, the interlocking members are configured to be interlocked by moving one of the interlocking members in a transverse direction into the other interlocking member, such as by aligning the interlocking members and moving the first and second parts toward one another in a transverse direction. The transverse direction herein refers to a direction perpendicular to the longitudinal direction. This facilitates assembly of a transmission in which the gear shifting device is comprised, since the first part of the rod and the first shift fork, and the second part of the rod and the second shift fork, respectively, may be pre-assembled separately and connected in a final step of assembling the transmission.

For example, the first part of the rod may be configured to be connected to the actuator, and the interlocking members may be configured to be interlocked by moving the first interlocking member into or onto the second interlocking member in the transverse direction.

Optionally, the interlocking members are configured to prevent relative rotation of the first and second parts, such as relative rotation about the longitudinal axis and/or relative rotation in a plane perpendicular to the transverse direction referred to above. The interlocking members thus have interlocking surfaces preventing relative rotation. This implies a safe and stable interconnection. Preferably, the interlocking members may only allow relative movement in one direction, i.e., the above-mentioned transverse direction.

Optionally, the first shift fork comprises a first rod-connecting portion and at least one first engagement member for engaging with a first gear engaging sleeve, and the second shift fork comprises a second rod-connecting portion and at least one second engagement member for engaging with a second gear engaging sleeve, wherein the first shift fork and the second shift fork are bent such that, when the first and second parts of the rod are connected, a first axial distance between the first and second rod connecting portions differs from a second axial distance between the first and second at least one engagement members. By way of example, the first axial distance may be larger than the second axial distance.

Optionally, the rod further comprises a third part and the set of shift forks further comprises a third shift fork fixed to the third part of the rod, wherein the third part is mechanically connected to the first and second parts. In this configuration, three shift forks can be actuated in unison. Two connection interfaces may be provided for connecting the three parts together. The connection interfaces may be identical or of the same type, or different types of connection interfaces may be used. All three parts of the rod are mechanically connected to be movable in unison along the longitudinal axis of the rod.

According to a second aspect of the invention, at least one of the above objects is achieved by a transmission according to claim 7. The transmission is configured for transmission of torque, such as between a first shaft and a second shaft of the transmission, via a set of selectively engageable gears. It comprises a gear shifting device according to the first aspect, and it further comprises:

a transmission housing comprising a first housing portion and a second housing portion, the second housing portion being fixed to the first housing portion, a transmission control unit fixed to the first housing portion and an actuator controllable by the transmission control unit for moving the rod along its longitudinal axis, the actuator being rigidly connected to the first part of the rod, wherein the second housing portion comprises a recess in which an end portion of the second part of the rod is slidably received.

The rod may thus slide within the recess upon actuation of the rod using the actuator. The recess is configured to prevent the rod from moving in a non-axial direction. A bearing, such as a plain bearing, or a bushing, may be comprised within the recess.

The transmission may of course comprise a plurality of other components, such as gearwheels, shafts, and sleeves.

Optionally, the first housing portion comprises a through-hole or bracket through which the second part of the rod extends and in which it is slidably received. Thereby, the second part of the rod is maintained in its position by the recess in the second housing portion and the through-hole or bracket of the first housing portion. The second shift fork may be provided on a second side of the through-hole or bracket, i.e., on the same side of the through-hole or bracket as the recess receiving the end portion of the second part of the rod. The second shift fork may thus be located in the second housing portion.

Optionally, the transmission further comprises a gearwheel or a set of gearwheels being rotatably arranged on a shaft, the gearwheel or the set of gearwheels being selectively engageable for transmission of torque by means of the set of shift forks, each gearwheel comprising at least one annular pocket centred on the shaft, wherein each shift fork is configured to be movable by the shift rod to a position in which it extends into a respective one of the at least one annular pocket. Of course, the transmission may comprise a plurality of additional gearwheels, such as gearwheels arranged in driving connection, such as in meshing engagement, with the above-mentioned gearwheel or the set of gearwheels for transmission of torque.

Optionally, the gearwheel or the set of gearwheels comprise at least a first and a second annular pocket opening in opposite directions, the first shift fork being movable to a position in which it extends into the first annular pocket and the second shift fork being movable to a position in which it extends into the second annular pocket. The first and second shift forks are movable by means of the rod.

Optionally, the first and second annular pockets are provided on the same gearwheel.

Optionally, the first and second annular pockets are provided on different gearwheels, such as the first annular pocket being provided on a first gearwheel and the second annular pocket being provided on a second gearwheel adjacent to the first gearwheel. In this case, the first and second annular pockets may face away from one another, the shift forks being bent such that, when the first and second parts of the rod are connected, a first axial distance between the first and second rod connecting portions is larger than a second axial distance between the first and second at least one engagement members. Hence, the shift forks are bent "inwards".

However, the first and second pockets may instead face each other, in which case the shift forks are bent such that, when the first and second parts of the rod are connected, a first axial distance between the first and second rod connecting portions is smaller than a second axial distance between the first and second at least one engagement members. Hence, the shift forks are bent "outwards".

Optionally, the transmission further comprises a set of gear engaging sleeves, each gear engaging sleeve being movable by a respective one of the shift forks. Each gear engaging sleeve may be movable by its associated shift fork into and out of a position within one of the annular pockets.

According to a third aspect, at least one of the above-mentioned objects is achieved by a method according to claim 13. Thus, a method for assembling a transmission according to the second aspect is provided, the method comprising:

pre-assembling the first part of the rod and the first shift fork with the transmission control unit and the actuator, pre-assembling the second part of the rod and the second shift fork, mounting the second part of the rod and the second shift fork pre-assembled therewith to the first housing portion with the second part of the rod extending through a through-hole or bracket of the first housing portion, the second shift fork and an interlocking member of the second part being provided on opposite sides of the through-hole or bracket, assembling the second housing portion with the first housing portion so that an end portion of the second part of the rod is slidably received in the recess, said end portion being provided on the same side of the through-hole or bracket as the second shift fork, mounting the transmission control unit and the actuator with the first part of the rod and the first shift fork pre-assembled therewith onto the first housing portion into which the second part of the rod extends, thereby connecting the first and second parts of the rod via the first connection interface.

After assembly, the first end portion of the second part of the rod is slidably received in the recess of the second housing portion. A second end portion of the second part of the rod, comprising an interlocking member, is provided inside of the first housing portion, and the second shift fork is provided outside of the through-hole or bracket, such as outside of the first housing portion.

Optionally, mounting the transmission control unit onto the first housing portion comprises moving one of the transmission control unit and the first housing portion toward the other one of the transmission control unit and the first housing portion in a direction perpendicular to the longitudinal axis of the rod. This corresponds to the above-mentioned transverse direction.

According to a fourth aspect, a vehicle comprising a transmission according to the second aspect is provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the Drawings.

Figure 1:
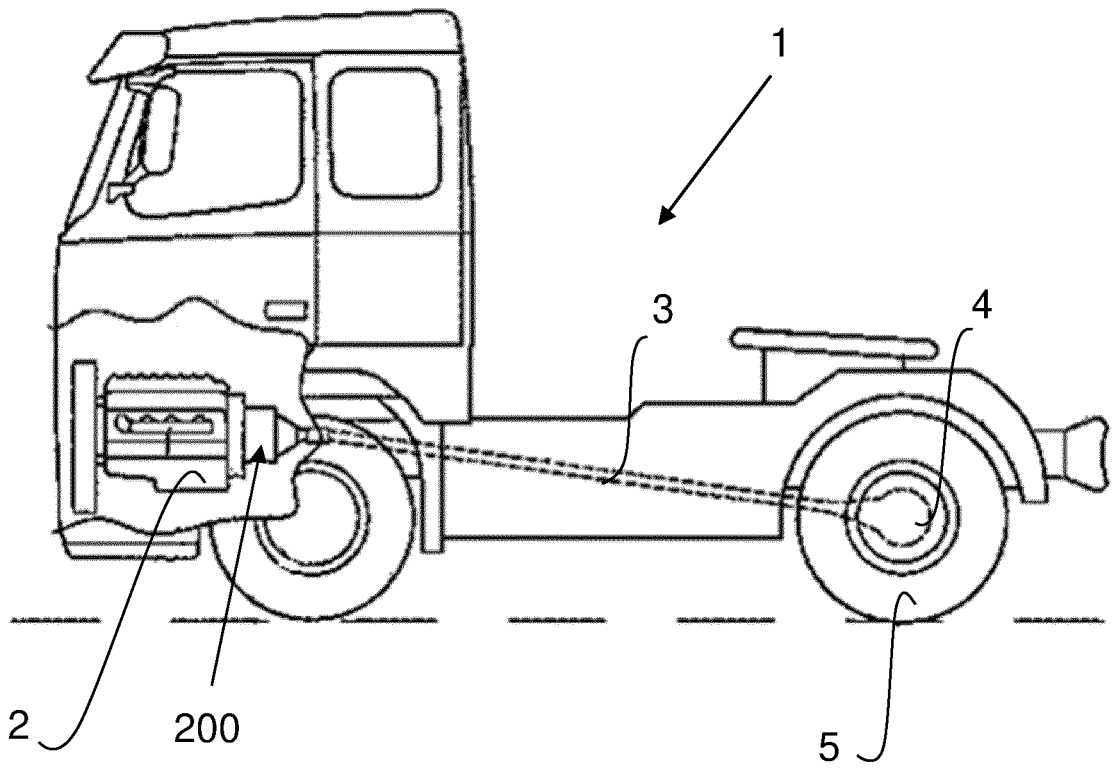
FIG. 1 illustrates a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 1 in the form of a truck in which a gear shifting device according to the invention may be applied is schematically shown in FIG. 1. The vehicle 1 includes a powertrain with an internal combustion engine 2 for propulsion of the vehicle 1, connected to a transmission 200. The transmission 200 is arranged to transfer torque from the engine 2 to a drive shaft 3 connecting the transmission 200 to a driven axle 4 that drives ground engaging members in the form of wheels 5 of the vehicle 1. The vehicle 1 may be arranged with more than one driven axle, such as two or more driven axles. Instead of, or in addition to, an internal combustion engine 2, the vehicle may comprise one or more electric machines for powering the vehicle.

Figures 2, 3:
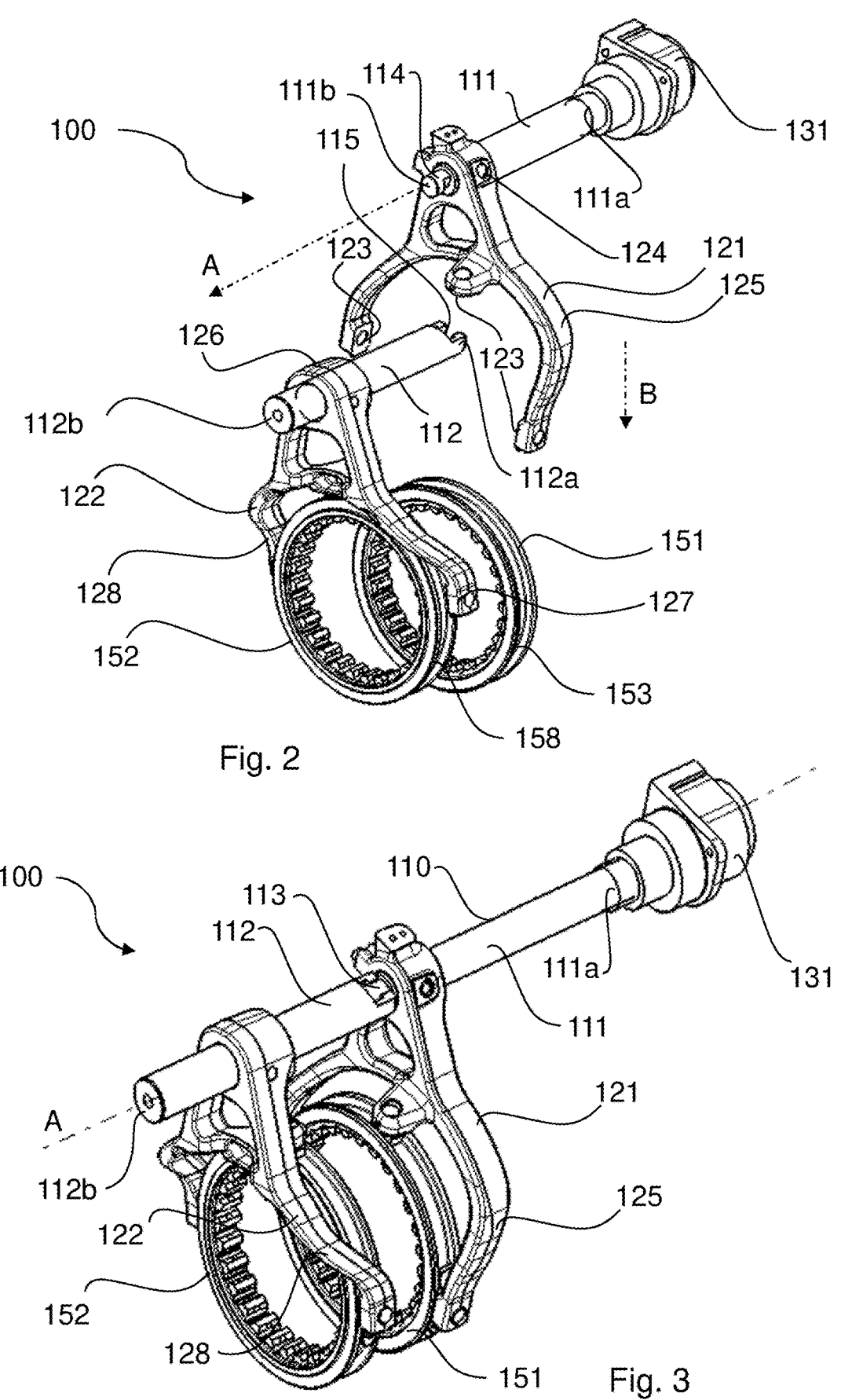
FIG. 2 is a partly exploded perspective view of a gear shifting device according to an embodiment of the invention.
FIG. 3 is another perspective view of the gear shifting device shown in FIG. 2.

FIGS. 2-3 show a gear shifting device 100 according to an embodiment of the invention. The gear shifting device 100 may by way of example be used in the transmission 200 illustrated in FIG. 1. It comprises a rod 110 extending along a longitudinal axis A. The rod 110 is configured to be connected to an actuator 131, such as a pneumatic or electric actuator, for moving the rod 110 back and forth along the longitudinal axis A. The rod 110 comprises a first part 111 and a second part 112, mechanically connectable via a connection interface 113. The gear shifting device 100 further comprises a set of shift forks 121, 122 including a first shift fork 121 and a second shift fork 122. The first shift fork 121 is fixed to the first part 111 of the rod 110, and the second shift fork 122 is fixed to the second part 112 of the rod 110. When the first part 111 and the second part 112 are connected via the connection interface 113, the first and second shift forks 121, 122 can be actuated in unison, i.e., moved simultaneously, along the longitudinal direction A, by means of the actuator 131 acting on the rod 111.

The first part 111 of the rod 110 is herein fixed to the actuator 131 at a first end portion 111a of the first part 111. A second end portion 111b of the first part 111 comprises a first interlocking member 114 configured to be received in a second interlocking member 115 provided on a first end portion 112a of the second part 112. The first and second interlocking members 114, 115 are configured to, when interlocked, prevent relative movement of the first and second parts 111, 112 along the longitudinal axis A. Interlocking is achieved by moving the first interlocking member 114 into the second interlocking member 115 in a transverse direction B, perpendicular to the longitudinal direction A. FIG. 2 shows the gear shifting device 100 prior to connecting the first and second parts 111, 112. FIG. 3 shows the gear shifting device 100 after connection of the first and second parts 111, 112.

In the illustrated embodiment, the second interlocking member 115 is illustrated as a female interlocking member and the first interlocking member 114 is illustrated as a male interlocking member, although other configurations are of course possible, as long as relative axial movement of the parts 111, 112 along the axis A is prevented. In the shown embodiment, the interlocking members 114, 115 are further formed with interlocking surfaces that prevent relative rotation of the parts 111, 112 around the longitudinal axis A.

The first and second shift forks 121, 122 are configured to engage a first and second gear engaging sleeve 151, 152, respectively. For this purpose, the first shift fork 121 comprises three first engagement members 123 and the second shift fork comprise three second engagement members 127, for engaging with an annular groove 153, 158 of the respective sleeve 151, 152. The three first engagement members 123 of the first shift fork 121 are located on a first lower fork portion 125 of the first shift fork 121 and the three second engagement members 127 of the second shift fork 122 are located on a second lower fork portion 128 of the second shift fork 122. Although three engagement members 123, 127 per shift fork 121, 122 are illustrated herein, a different number of engagement members may be provided, such as two engagement members per shift fork.

Figure 4:
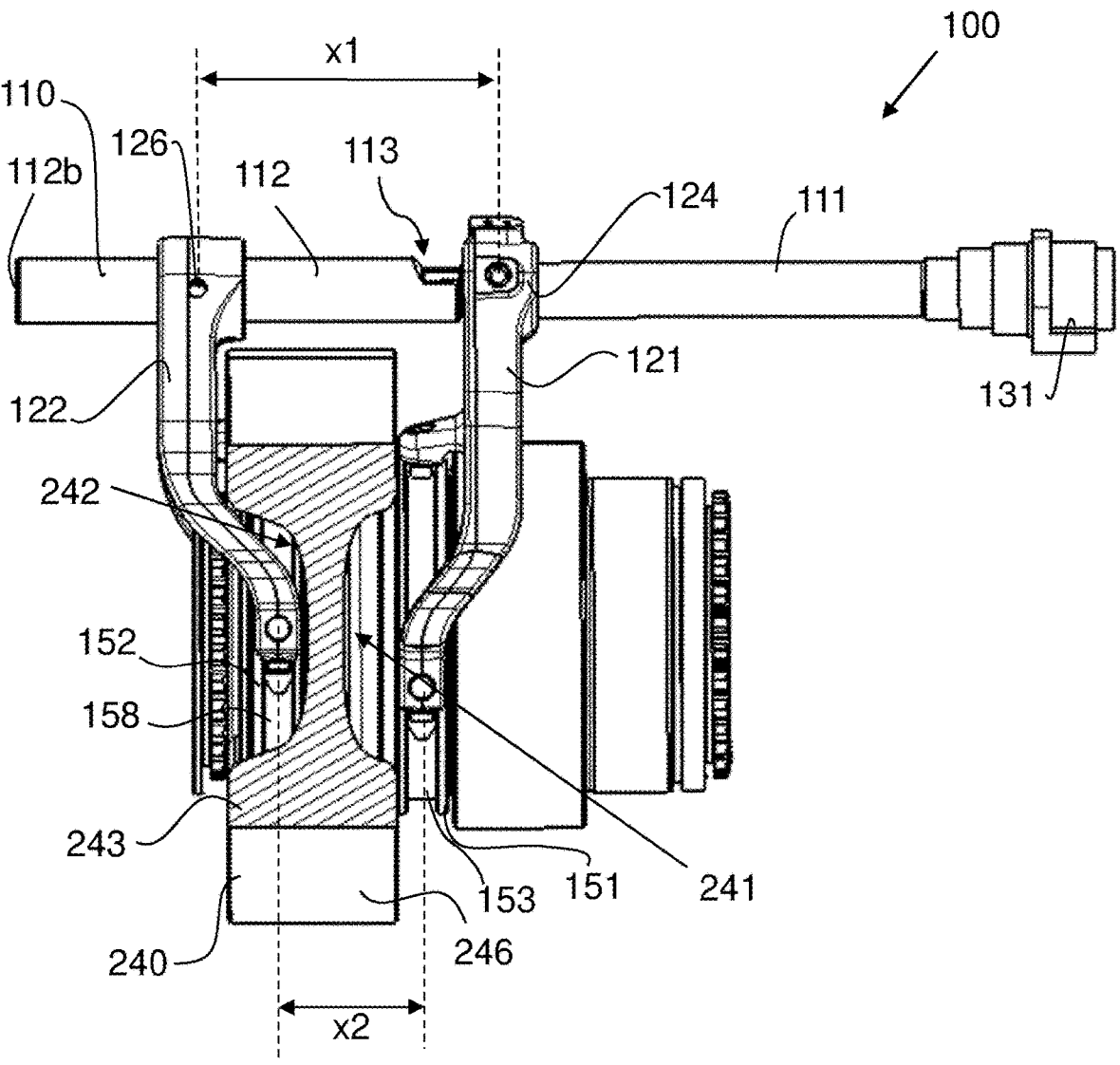
FIG. 4 is a side view of the gear shifting device shown in FIG. 2.

The first shift fork 121 further has a first rod-connecting portion 124 attached to the first part 111 of the rod 110, herein close to the first interlocking member 114. The first shift fork 121 is further bent so that, when seen in a side view such as shown in FIG. 4, the first engagement members 123 are axially offset with respect to the first rod-connecting portion 124. The second shift fork 122 has a second rod-connecting portion 126 attached to the second part 112 of the rod 110. The first shift fork 121 and the second shift fork 122 are bent such that, when the first and second parts 111, 112 of the rod 110 are connected, a first axial distance x1 between the first and second rod connecting portions 124, 126 differs from a second axial distance x2 between the first engagement members 123 and the second engagement members 127. In the shown embodiment, the first axial distance x1 is larger than the second axial distance x2, although the opposite is also possible in other configurations.

When the first shift fork 121 is connected to the first gear engaging sleeve 151, the first gear engaging sleeve 151 herein lies axially further away from the actuator 131 than the first rod-connecting upper portion 124. The second shift fork 122 is bent in the opposite direction, so that when it engages with the second gear engaging sleeve 152, and when the first and second parts 111, 112 of the rod 110 are connected, the second gear engaging sleeve 152 is axially closer to the actuator 131 than the rod-connecting upper portion 126 of the second shift fork 122. The shift forks 121, 122 are thus bent toward one another.

Figure 5:
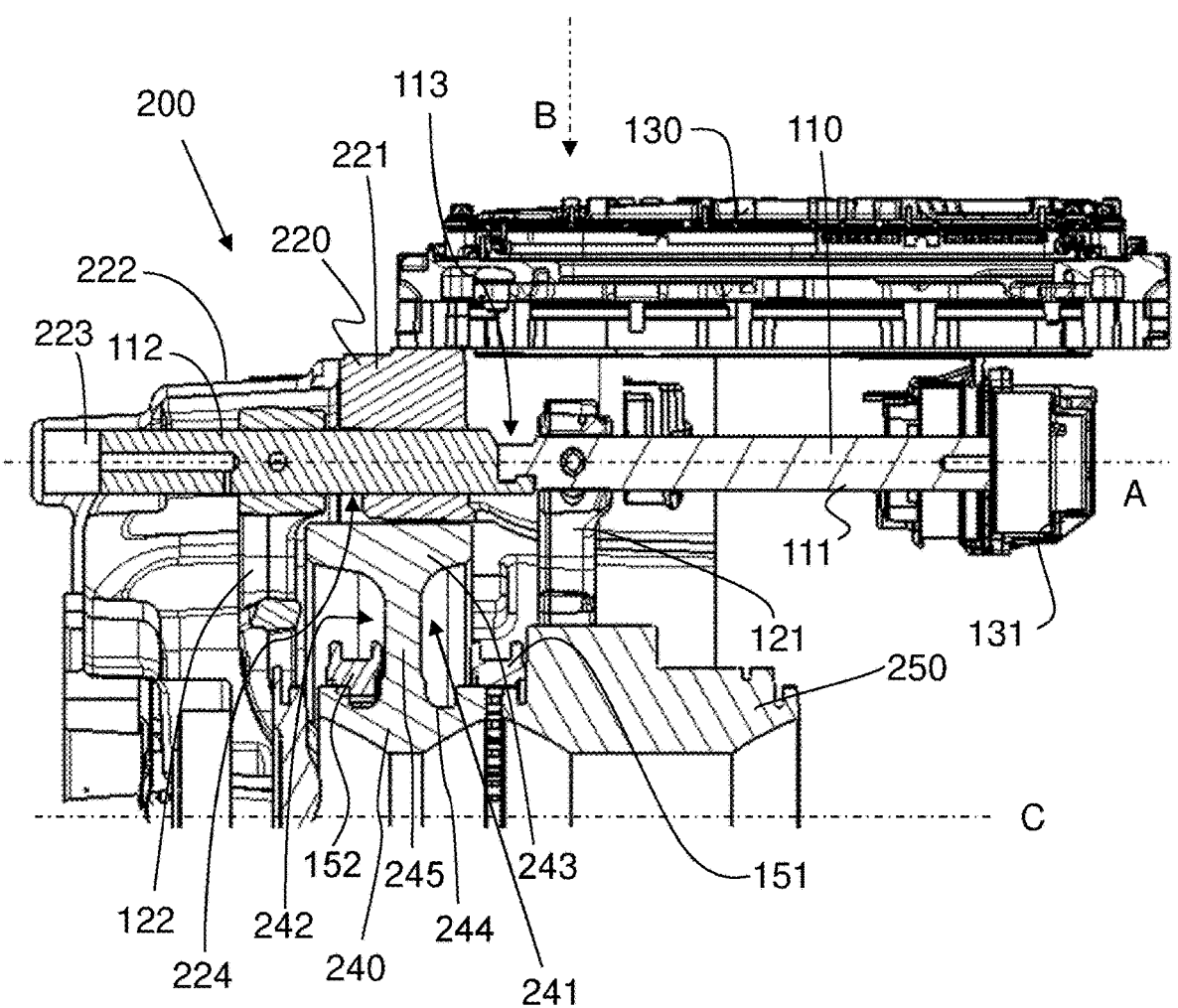
FIG. 5 is a sectional view of parts of a transmission according to an embodiment of the invention.

Reference is now made to FIGS. 4 and 5, showing gear shifting device 100 together with a gearwheel 240 of a transmission 200. The gearwheel 240 is rotatably arranged on a shaft (not shown) extending along an axis C, which is parallel with the longitudinal axis A. The gearwheel 240 is selectively engageable for transmission of torque by means of the set of shift forks 121, 122 acting on the sleeves 151, 152. The gearwheel 240 comprises an annular gear tooth portion 243 comprising a plurality of external gear teeth 246, and an annular inner flange portion 244 provided radially inside of the gear tooth portion 243 and rigidly connected to the gear tooth portion 243 by an annular connecting portion

245. Two annular pockets 241, 242 facing in opposite directions along the longitudinal axis A are formed between the inner flange portion 244 and the gear tooth portion 243. A first annular pocket 241 is provided on a first side of the gearwheel 240, facing the first shift fork 121. A second annular pocket 242 is provided on a second side of the gearwheel 240, facing the second shift fork 122.

The first shift fork 121 and the first gear engaging sleeve 151 are movable by the rod 110 to a position in which the first shift fork 121 extends into the first annular pocket 241. The second shift fork 222 and the second gear engaging sleeve 152 are movable by the rod 110 to a position in which the second shift fork 222 extends into the second annular pocket 242. The first and second shift forks 121, 122 are movable in unison, such that when the first shift fork 121 and the first gear engaging sleeve 151 is moved into the first annular pocket 241, the second shift fork 122 and the first gear engaging sleeve 152 are moved out of the second annular pocket 242, and vice versa. In FIG. 5, the first gear engaging sleeve 151 rotationally connects the gearwheel 240 to an adjacent gearwheel 250, while the second gear engaging sleeve 152 is located entirely within the second annular pocket 242. By moving the rod 110 one step to the left, a neutral position can be achieved, in which none of the gear engaging sleeves 151, 152 engages a gear. By moving the rod 110 two steps to the left, the second gear engaging sleeve 152 rotationally connects the gearwheel 240 to the shaft via a component fixed to the shaft, while the first gear engaging sleeve 151 is entirely located within the first annular pocket 241.

FIG. 5 is a sectional view showing parts of a transmission 200, such as the transmission 200 referred to above. The transmission 200 is configured for transmission of torque via a set of selectively engageable gears, such as between an input shaft and an output shaft (not shown). The transmission 200 includes a transmission housing 220 comprising a first housing portion 221 and a second housing portion 222, the second housing portion 222 being fixed to the first housing portion 221. A transmission control unit 130 is fixed to the first housing portion 221. The actuator 131 is controllable by the transmission control unit 130 for moving the rod 110 in the axial direction. The actuator 131 is rigidly connected to the first part 111 of the rod 110. The second housing portion 222 comprises a recess 223 in which a second end portion 112*b* of the second part 112 of the rod 110 is slidably received. The first housing portion 221 further comprises a through-hole 224, which may alternatively be a bracket fixed to the first housing portion 221, through which the second part 112 of the rod 110 extends and in which it is slidably received. The second shift fork 122 is positioned on a second side of the through-hole 224, on the same side of the through-hole 224 as the recess 223.

Figure 6:
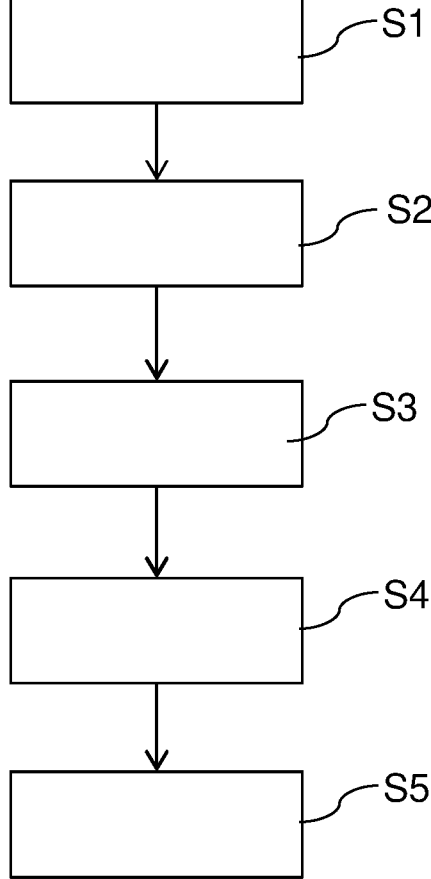
FIG. 6 is a flow chart illustrating a method according to an embodiment of the invention.

FIG. 6 illustrates a method for assembling a transmission 200, such as the transmission 200 illustrated in FIG. 5.

In a first step S1, the first part 111 of the rod 110 and the first shift fork 121 are pre-assembled with the transmission control unit 130 and the actuator 131.

In a second step S2, the second part 112 of the rod 110 and the second shift fork 122 are pre-assembled.

The first and second steps may be carried out in any suitable order. Pre-assembled parts may be delivered from other locations and the first and second steps may thus not necessarily be carried out in connection with subsequent steps.

In a third step S3, the second part 112 of the rod 110 and the second shift fork 122 pre-assembled therewith are mounted to the first housing portion 221 with the second part 112 of the rod 110 extending through the through-hole 224, or bracket. The second shift fork 122 and the second interlocking member 115 are, after mounting, provided on opposite sides of the through-hole 224 or bracket. At least the second interlocking member 115 is located within the first housing portion 221. Other components of the transmission 200, such as shafts, gearwheels, etc., may be mounted into the first housing portion 221 in connection with, or prior to, the third step S3. For example, the gearwheel 240 and the gear engaging sleeves 151, 152, provided on a shaft, may be mounted into the first housing portion 221, and the second shift fork 122 may be engaged with the second gear engaging sleeve 152 in its position outside of the second annular pocket 242.

In a fourth step S4, the second housing portion 222 is assembled with the first housing portion 221 so that the second end portion 112*b* of the second part 112 of the rod 110 is slidably received in the recess 223.

In a fifth step S5, the transmission control unit 130 and the actuator 131, with the first part 111 of the rod 110 and the first shift fork 121 pre-assembled therewith, are mounted onto the first housing portion 221 into which the second part 112 of the rod 110 extends. Thereby, the first and second parts 111, 112 of the rod 110 are connected via the first connection interface 113. To successfully perform this step, the second part 112 of the rod 110 is first moved along the axial direction A so that the second shift fork 122 and the second gear engaging sleeve 152 enter into the second annular pocket 242. The first gear engaging sleeve 151 is positioned outside of the first annular pocket 241, which allows the first shift fork 121 to engage with the first gear engaging sleeve 151 when moved in the transverse direction B. Thus, the first shift fork 121 engages with the first gear engaging sleeve 151 at the same time as the first part 111 of the rod 110 connects to the second part 112 of the rod via the connection interface 113.

In non-illustrated embodiments of the invention, the rod is divided into more than two parts, such as into three parts. Each part carries at least one shift fork. A connection interface is provided between each two parts. For three parts, two connection interfaces are provided.

The shift forks are in the illustrated embodiment configured to engage with gear engaging sleeves acting on the same gearwheels. However, the shift forks may also be configured to move gear engaging sleeves acting on different gearwheels, provided on the same shaft or even on different shafts. For example, if two input shafts are provided, two shift forks may be provided that are configured to simultaneously act on gearwheels on different input shafts.

It is to be understood that the present invention is not limited to the embodiments described above and illustrated in the drawings; rather, the skilled person will recognize that many changes and modifications may be made within the scope of the appended claims.

The invention claimed is:

1. A gear shifting device for a transmission of a vehicle, comprising:
   a rod configured to be connected to an actuator for moving the rod along a longitudinal axis of the rod,
   a set of shift forks comprising a first shift fork and a second shift fork, the first and second shift forks being fixed to the rod so as to be actuated in unison, characterized in that
   the rod comprises a first part and a second part configured to be mechanically connected to each other via at least one connection interface, wherein the first shift fork is fixed to the first part of the rod and the second shift fork is fixed to the second part of the rod,
   wherein the first part of the rod comprises a first interlocking member and the second part of the rod comprises a second interlocking member, wherein the first and second interlocking members constitute the connection interface, and are configured to, when mechanically interlocked, prevent relative movement of the first and second parts along the longitudinal axis, and wherein the interlocking members are configured to be mechanically interlocked by moving one of the interlocking members in a transverse direction into or onto the other interlocking member.

2. The gear shifting device according to claim 1, wherein the interlocking members are configured to be prevent relative rotation of the first and second parts.

3. The gear shifting device according to claim 1, wherein the first shift fork comprises a first rod-connecting portion and at least one first engagement member for engaging with a first gear engaging sleeve, and wherein the second shift fork comprises a second rod-connecting portion and at least one second engagement member for engaging with a second gear engaging sleeve, wherein the first shift fork and the second shift fork are bent such that, when the first and second parts of the rod are connected, a first axial distance between the first and second rod connecting portions differs from a second axial distance between the first and second at least one engagement members.

4. The gear shifting device according to claim 1, wherein the rod further comprises a third part and wherein the set of shift forks further comprises a third shift fork fixed to the third part of the rod, wherein the third part is mechanically connected to the first and second parts.

5. A transmission configured for transmission of torque via a set of selectively engageable gears, the transmission comprising a gear shifting device according to claim 1, the transmission further comprising:
   a transmission housing comprising a first housing portion and a second housing portion, the second housing portion being fixed to the first housing portion,
   a transmission control unit fixed to the first housing portion and an actuator controllable by the transmission control unit for moving the rod along its longitudinal axis, the actuator being rigidly connected to the first part of the rod,
   wherein the second housing portion comprises a recess in which an end portion of the second part of the rod is slidably received.

6. The transmission according to claim 5, wherein the first housing portion comprises a through-hole or bracket through which the second part of the rod extends and in which it is slidably received.

7. The transmission according to claim 5, further comprising a gearwheel or a set of gearwheels being rotatably arranged on a shaft, the gearwheel or the set of gearwheels being selectively engageable for transmission of torque by means of the set of shift forks, each gearwheel comprising at least one annular pocket centred on the shaft, wherein each shift fork is configured to be movable by the rod to a position in which it extends into a respective one of the at least one annular pocket.

8. The transmission according to claim 7, wherein the gearwheel or the set of gearwheels comprise at least a first and a second annular pocket opening in opposite directions, the first shift fork being movable to a position in which it extends into the first annular pocket and the second shift fork being movable to a position in which it extends into the second annular pocket.

9. The transmission according to claim 8, wherein the first and second annular pockets are provided on the same gearwheel, or wherein the first and second annular pockets are provided on different gearwheels.

10. The transmission according to claim 5, further comprising a set of gear engaging sleeves, each gear engaging sleeve being movable by a respective one of the shift forks.

11. A vehicle comprising a transmission according to claim 5.

12. A method for assembling a transmission according to claim 5, the method comprising:

pre-assembling the first part of the rod and the first shift fork with the transmission control unit and the actuator, pre-assembling the second part of the rod and the second shift fork, mounting the second part of the rod and the second shift fork pre-assembled therewith to the first housing portion with the second part of the rod extending through a through-hole or bracket of the first housing portion, the second shift fork and an interlocking member of the second part being provided on opposite sides of the through-hole or bracket, assembling the second housing portion with the first housing portion so that the end portion of the second part of the rod is slidably received in the recess, mounting the transmission control unit and the actuator with the first part of the rod and the first shift fork pre-assembled therewith onto the first housing portion into which the second part of the rod extends, thereby connecting the first and second parts of the rod via the first connection interface.

13. The method according to claim 12, wherein mounting the transmission control unit onto the first housing portion comprises moving one of the transmission control unit and the first housing portion toward the other one of the transmission control unit and the first housing portion in a direction perpendicular to the longitudinal axis of the rod.

* * * * *